United States Patent
Broer et al.

(10) Patent No.: US 9,677,722 B2
(45) Date of Patent: Jun. 13, 2017

(54) FLAT OPTICAL FIBER LIGHTING ASSEMBLY WITH INTEGRATED ELECTRICAL CIRCUITRY

(75) Inventors: Peter W. Broer, Bratenahl, OH (US); Gregg M. Kloeppel, Sheffield Lake, OH (US); Michael D. Andrich, Medina, OH (US); Mark Cartellone, Broadview Heights, OH (US); Brian M. Spahnie, Brunswick, OH (US)

(73) Assignee: LUMITEX, INC., Strongsville, OH (US)

( * ) Notice: Subject to any disclaimer, the term of this patent is extended or adjusted under 35 U.S.C. 154(b) by 632 days.

(21) Appl. No.: 13/985,675

(22) PCT Filed: Feb. 22, 2012

(86) PCT No.: PCT/US2012/026006
§ 371 (c)(1),
(2), (4) Date: Aug. 15, 2013

(87) PCT Pub. No.: WO2012/115999
PCT Pub. Date: Aug. 30, 2012

(65) Prior Publication Data
US 2013/0329447 A1    Dec. 12, 2013

Related U.S. Application Data
(60) Provisional application No. 61/446,715, filed on Feb. 25, 2011, provisional application No. 61/512,192, filed on Jul. 27, 2011.

(51) Int. Cl.
*F21K 99/00*    (2016.01)
*F21K 9/61*    (2016.01)
*F21V 8/00*    (2006.01)

(52) U.S. Cl.
CPC .............. *F21K 9/61* (2016.08); *G02B 6/0083* (2013.01); *G02B 6/006* (2013.01); *G02B 6/0036* (2013.01)

(58) Field of Classification Search
CPC ......... F21K 9/52; G02B 6/0083; G02B 6/006; G02B 6/0036
See application file for complete search history.

(56) References Cited

U.S. PATENT DOCUMENTS

| 4,885,574 A | 12/1989 | Negishi et al. |
| 5,975,711 A | 11/1999 | Parker et al. |

(Continued)

FOREIGN PATENT DOCUMENTS

| CN | 101030775 | 9/2007 |
| JP | S64-013755 | 1/1989 |

(Continued)

OTHER PUBLICATIONS

International Preliminary Report on Patentability and Written Opinion of the International Searching Authority in PCT/US2012/026006, mailed Sep. 6, 2013 (9 pages).

(Continued)

*Primary Examiner* — Stephen F Husar
(74) *Attorney, Agent, or Firm* — Grant Steyer

(57) ABSTRACT

Lighting assembly comprises an optical fiber light guide panel member having a light conducting core cladded on opposite sides by cladding made of optically transparent material having a lower index of refraction than the light conducting core to cause total internal reflection of conducted light within the light conducting core at the core-cladding interface. Disruptions at one or more areas of the cladding cause conducted light within the light conducting core to be emitted from one or more areas of the panel member. Electrical circuitry is bonded to one or both sides (Continued)

of the cladding. One or more LEDs embedded in the panel member are in electrical conduct with the electrical circuitry and optically coupled to the light conducting core.

20 Claims, 5 Drawing Sheets

(56) References Cited

U.S. PATENT DOCUMENTS

| | | | |
|---|---|---|---|
| 6,491,412 B1 | 12/2002 | Bowman et al. | |
| 7,108,414 B2 | 9/2006 | McCollum et al. | |
| 7,114,840 B2 | 10/2006 | Hamrick | |
| 7,406,245 B2 | 7/2008 | Page et al. | |
| 7,811,843 B1 | 10/2010 | Lai | |
| 2002/0180711 A1 | 12/2002 | Umemoto et al. | |
| 2002/0180923 A1 | 12/2002 | Aoyagi et al. | |
| 2006/0024017 A1* | 2/2006 | Page | G02B 6/002 385/146 |
| 2006/0262568 A1 | 11/2006 | Blom et al. | |
| 2007/0210163 A1 | 9/2007 | Han | |
| 2008/0030651 A1 | 2/2008 | Shibata | |
| 2009/0129115 A1 | 5/2009 | Fine et al. | |

FOREIGN PATENT DOCUMENTS

| | | |
|---|---|---|
| JP | H11-015393 A | 1/1999 |
| JP | 2002-313121 A | 10/2002 |
| JP | 2004-126294 | 4/2004 |
| JP | 2006-066236 A | 3/2006 |
| JP | 2008-508556 A | 3/2008 |
| JP | 2010-129493 A | 6/2010 |

OTHER PUBLICATIONS

European Search Report for corresponding European Patent Application No. 12749021.7 dated Jan. 25, 2016.
Japanese Office Action for corresponding Japanese Patent Application No. 2013-555510 dated Jan. 5, 2016.
Office Action for corresponding Japanese Application No. 2013-555510, dated Dec. 6, 2016.

* cited by examiner

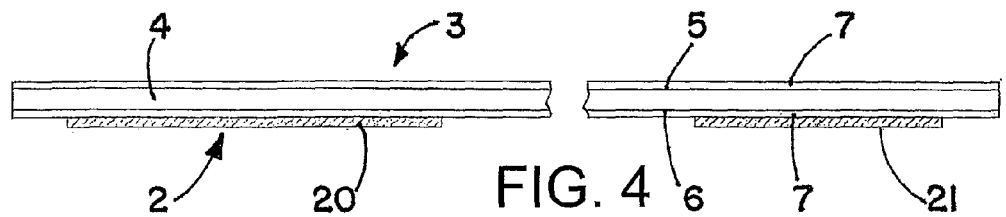
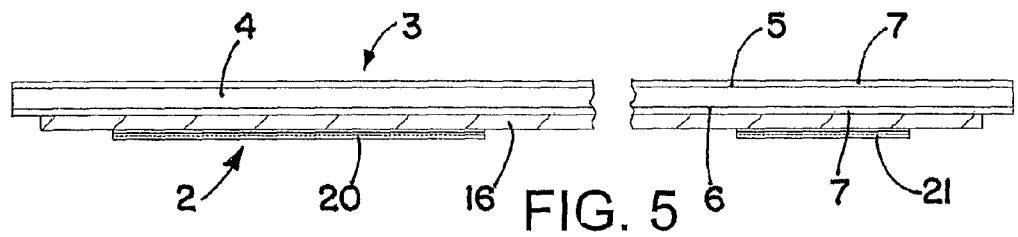
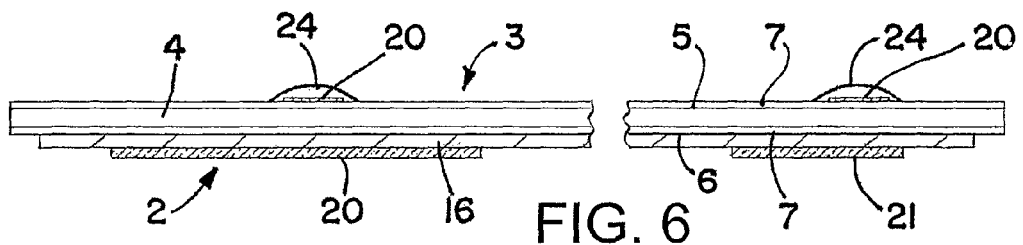
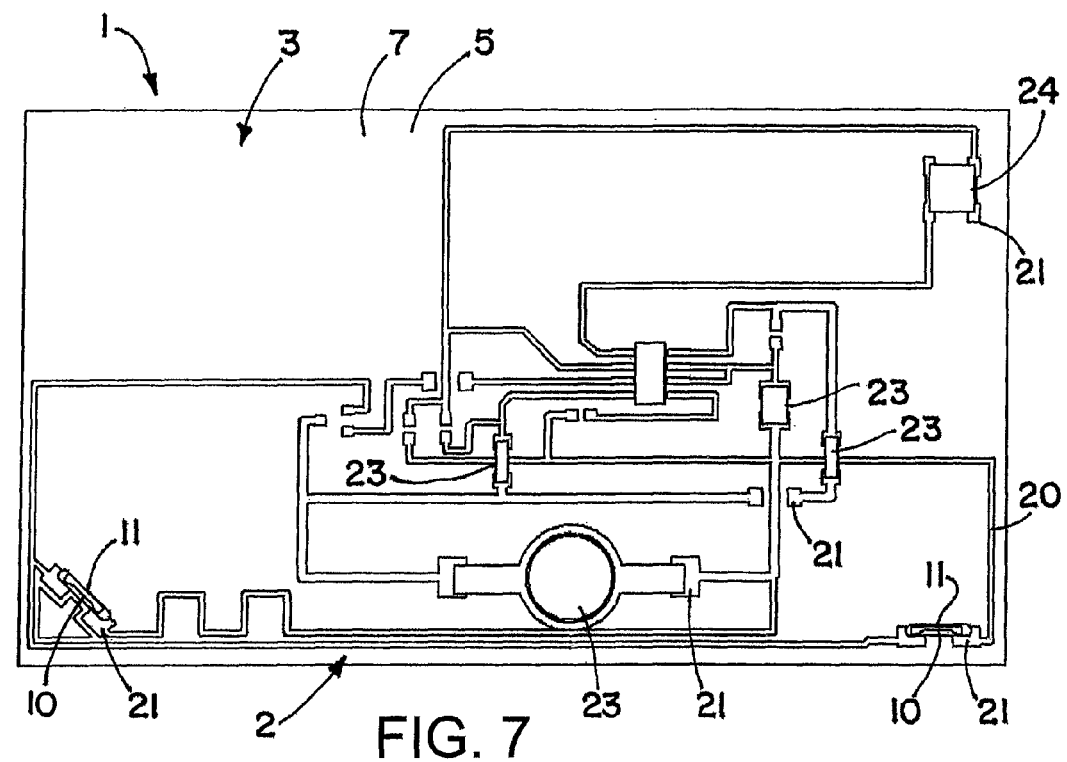

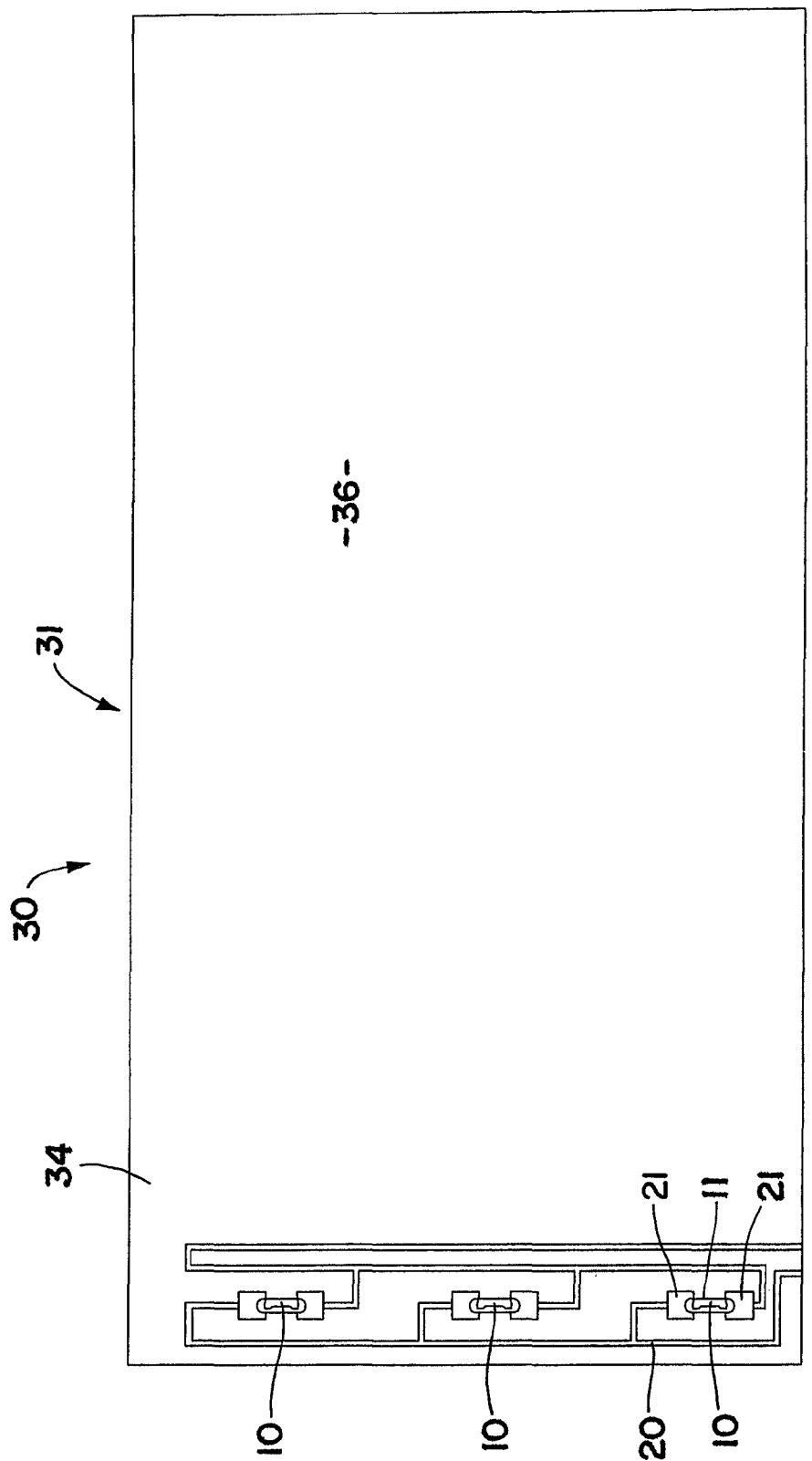

FLAT OPTICAL FIBER LIGHTING ASSEMBLY WITH INTEGRATED ELECTRICAL CIRCUITRY

This application is a national phase of International Application No. PCT/US2012/026006 filed 22 Feb. 2012 and published in the English language, and claims priority to U.S. 61/446,715 filed 25 Feb. 2011, and to U.S. 61/512,192 filed 27 Jul. 2011.

BACKGROUND

Electronic devices such as keyboards, keypads, display devices, phones, signage and other devices are oftentimes lighted to improve the visibility, ergonomics and general appearance appeal. Current lighting methods for these types of devices require multiple physical layers to generate, guide and deliver the light to the required areas. These layers typically include a lighting panel layer, a lighting circuit layer, and an electronic layer for switches and other electronic components.

SUMMARY OF THE INVENTION

The present invention enables the integration of circuitry, overlays, reflectors, display materials, switches and other electronic components into an integrated modular flat optical fiber lighting assembly that reduces overall assembly thickness, simplifies assembly, improves performance, and reduces material and assembly costs.

BRIEF DESCRIPTION OF THE DRAWINGS

FIG. 4 is an enlarged schematic fragmentary cross section of another lighting assembly embodiment.

FIG. 5 is an enlarged schematic fragmentary cross section of another lighting assembly embodiment.

FIG. 6 is an enlarged schematic fragmentary cross section of another lighting assembly embodiment.

FIG. 7 is a schematic plan view of one side of a fully integrated fiber optic lighting assembly embodiment.

FIG. 11 is a reduced schematic bottom plan view of the lighting assembly of FIG. 10.

DETAILED DESCRIPTION OF THE INVENTION

Referring now in detail to the drawings, their purpose is to illustrate one or more embodiments of the invention only and is not intended to limit the scope or spirit of the invention herein disclosed. Throughout the drawings, the same reference numbers are used to designate like parts.

Figure 1:
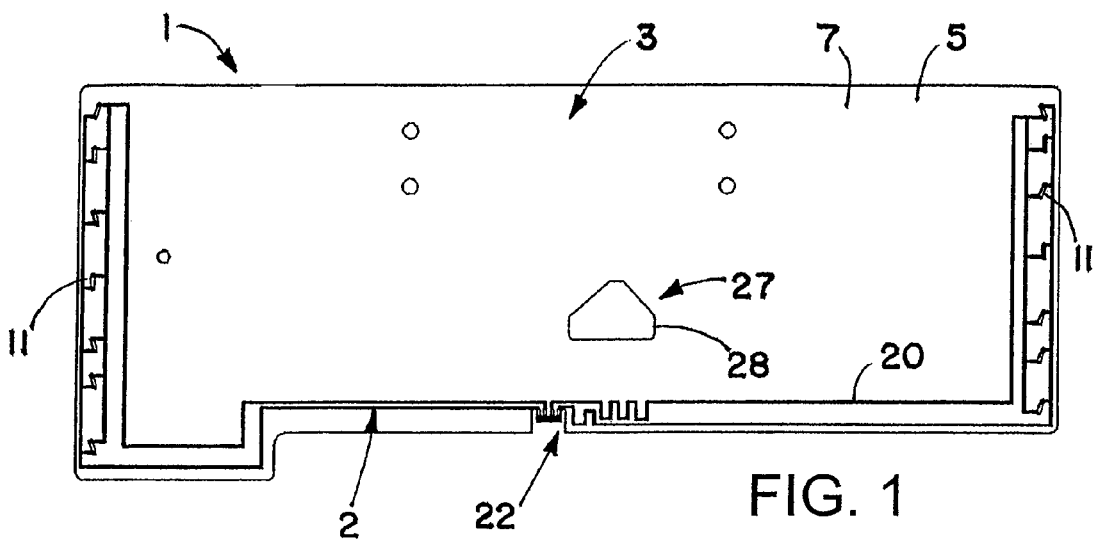
FIG. 1 is a schematic plan view of one side of a flat optical fiber lighting assembly embodiment of the present invention.
Figure 2:
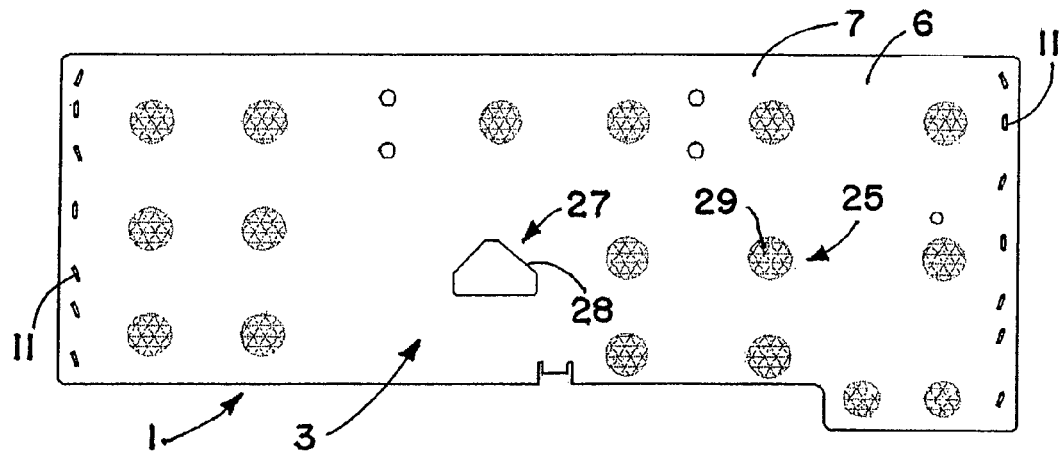
FIG. 2 is a schematic plan view of the opposite side of the lighting assembly of FIG. 1.
Figure 3:
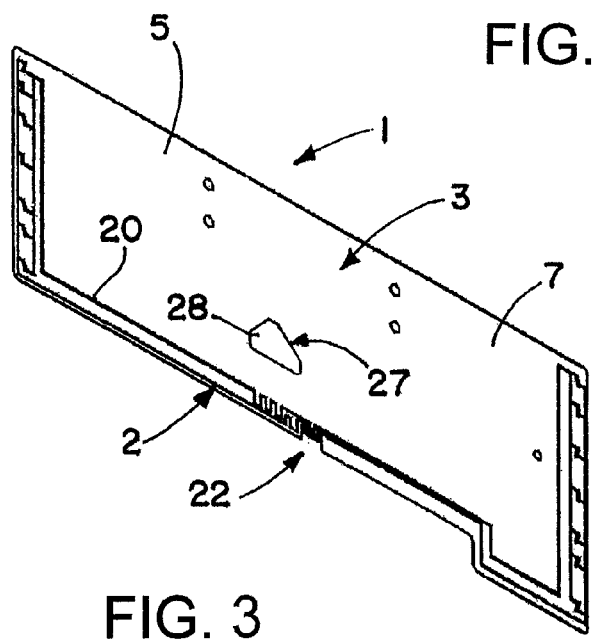
FIG. 3 is a schematic perspective view of the lighting assembly of FIG. 1.

FIGS. 1-3 schematically show one optical fiber lighting assembly embodiment 1 with integrated electrical circuitry 2. Lighting assembly 1 comprises a flat optical fiber light guide panel member 3 having opposite sides and side edges. The size (including thickness, width and length) of the panel member may be varied as desired depending on the particular application. However, the panel member will typically have a length and width many times greater than the thickness.

Panel member 3 comprises a light conducting core 4 (see FIGS. 4-6) made of a suitable optically transparent material such as glass or plastic having the desired optical characteristics. Opposite sides 5 and 6 of the light conducting core 4 are cladded by cladding 7 made of a suitable optically transparent material such as glass or plastic having a lower index of refraction than the light conducting core to cause total internal reflection of conducted light at the core-cladding interface.

Figure 9:
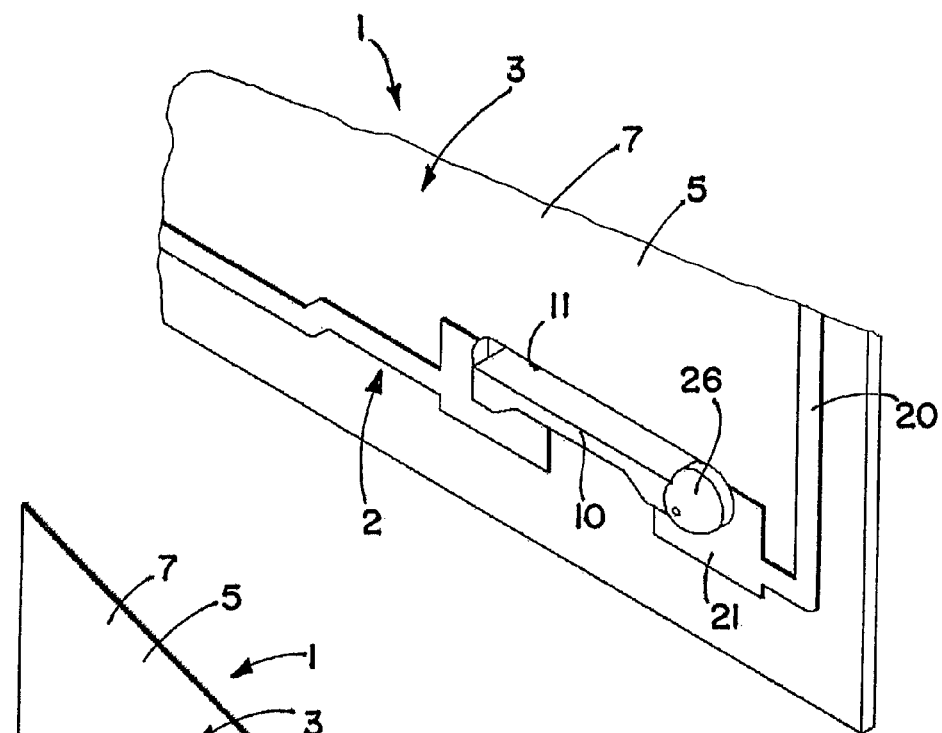
FIG. 9 is an enlarged fragmentary perspective view of a portion of the lighting assembly of FIGS. 7 and 8.
Figure 8:
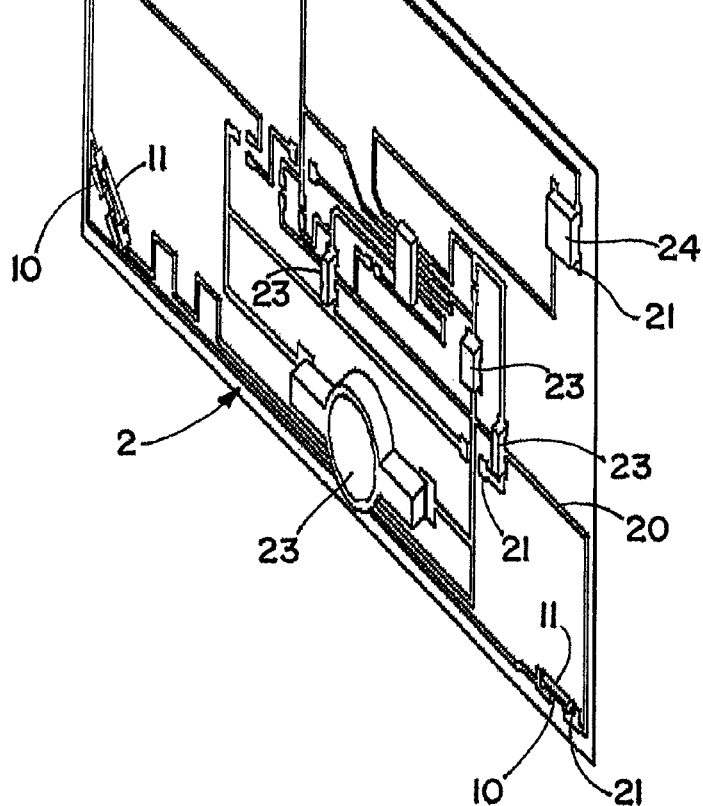
FIG. 8 is a schematic perspective view of the lighting assembly of FIG. 7.

Any number of light emitting diodes (LEDs) may be embedded at any desired location in the panel member 3 to provide conducted light to the light conducting core when the LEDs are lighted. FIGS. 7-9 show one or more LEDS 10 mounted in one or more slots 11 in the panel member. Electrical power is supplied to the LEDs 10 by electrical circuitry 2 that is either bonded directly to the cladding 7 on one or both sides of the panel member as shown in FIG. 4 or to a reflective layer (or feature plate) 16 that has been bonded directly to the cladding as shown in FIGS. 5 and 6. The cladding 7 allows the electrical circuitry 2 and/or reflective layer 16 to be applied directly to the panel member 3 with little or no interruption of conducted light because of the cladding which keeps the light rays within the panel member.

The electrical circuitry 2 comprises electrically conductive traces 20 and pads 21 to which electrical power is supplied as by providing a plug-in connector interface 22 on an edge of the panel member as shown in FIGS. 1 and 3 for connection by means of a standard cable connector to a central power source. This enables electrical power to be supplied not only to the LEDs, but also to other electrical components 23 and/or switches 24 bonded to the electrical circuitry 2 as schematically shown in FIGS. 6-8. Also FIG. 9 shows one of the LEDs 10 mounted in a slot 11 in the panel member 3 using electrically conductive adhesive 26 to attach the LED to the panel member and also electrically connect the LED to the electrical circuitry.

The LEDs 10 may be embedded within the panel member 3 wherever desired to provide a desired light distribution within the panel member. Also one or more light dams 27 in the form of openings 28 having different angled sides may be provided in the panel member (see FIGS. 1-3) for redirecting light within the panel member to difficult to reach areas of the panel member (e.g., around holes).

The conductive traces 20 may also provide a means of creating current limiting resistance to the LEDs. In one example, the conductive traces to each of the LEDs are equalized utilizing balancing resistors thereby allowing uniform electrical power distribution to each of the LEDs and providing uniform illumination from each of the LEDs. In another example, the conductive traces are varied to provide variable resistance, increasing brightness of the LEDs in selected areas of the panel member as desired to optimize lighting uniformity on an adjacent display area.

Conducted light within the panel member 3 is emitted from one or more selected areas of the panel member by disrupting the cladding 7 as by roughening, marring, abrading, etching or grit blasting selected areas 25 on one or both sides of the panel member as schematically shown in FIG. 2. The size, depth, density and/or location of the disruptions 29 on one or both sides of the panel member may be varied as desired to cause conducted light of the desired size and intensity to be emitted from one or more areas of the panel member.

FIGS. 7 and 8 show an optical fiber lighting assembly 1 with a fully integrated electronic circuit 2, LEDs 10 embedded in the panel member 3, and electronic components 23 and switches 24 bonded to the circuitry on one or both sides of the panel member. The bonded switches can provide a means to communicate to other circuitry. The lighting assembly may be used, for example, in a keyboard control application with the panel member providing backlighting for keyboard keys with keyboard circuitry integrated, or with conductive pads on the panel member to connect with keyboard circuitry, putting the lighting assembly in closer contact with the keys. Also the lighting assembly may be a separate module to be attached to a keyboard, and may include an integrated optical feature plate molded with key posts. Such a construction enables the integration of light sources, reflectors, overlays, circuitry, switches and display material all in a single integrated lighting assembly without the use of separate and distinct layers, thus reducing components, increasing reliability, reducing interconnections, and allowing the lighting assembly to be made very thin, more uniform, and potentially more efficient.

Figure 10:
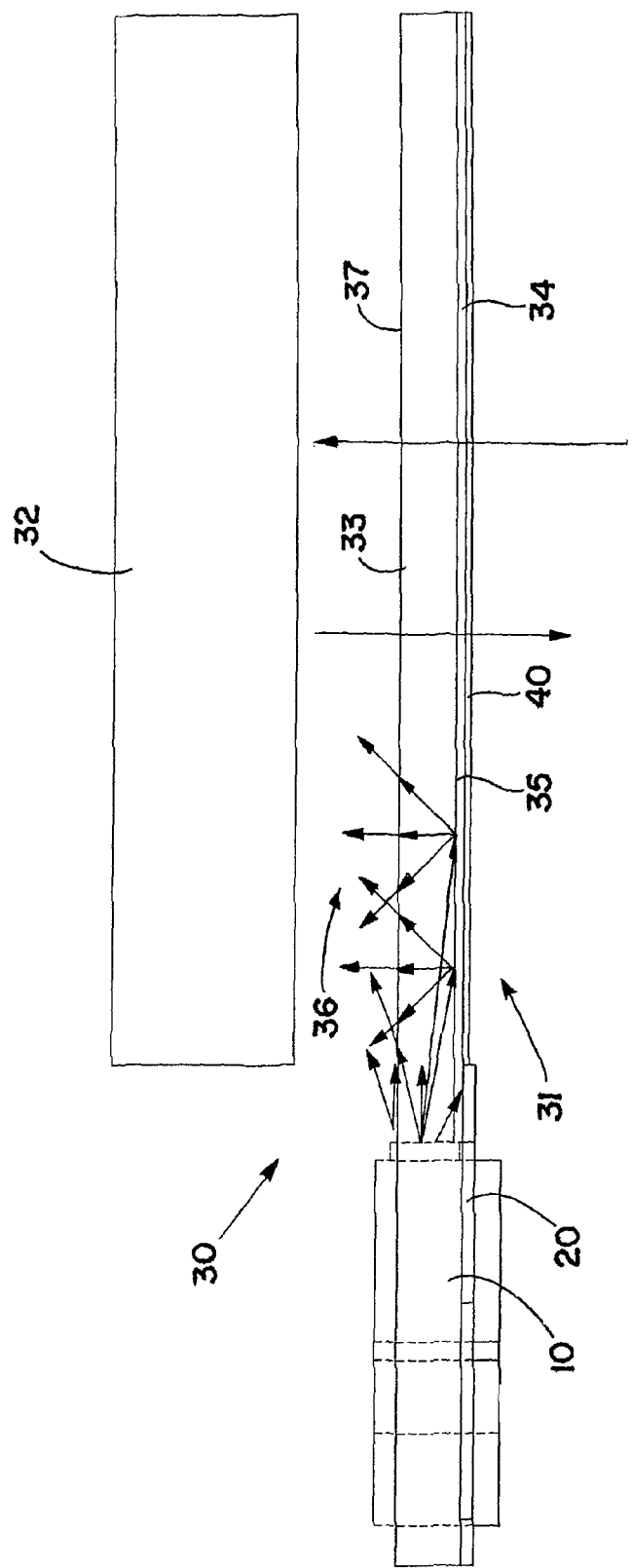
FIG. 10 is a schematic fragmentary cross section through another lighting assembly embodiment including an associated front lighted display device.

FIGS. 10 and 11 show another lighting assembly 30 embodiment comprising an integrated optical fiber light guide panel member 31 for illuminating a display device 32 in low ambient light conditions as described hereafter. The display device 32 can be any display requiring additional lighting for viewing in low ambient light conditions, but typically would provide lighting for E-inks used in electronic reading devices or similar display technologies.

The panel member has a light conductive or transmissive core layer 33 that is cladded on one side only by a transflective cladding 34 made of a suitable optically transparent material having a lower index of refraction than the light conductive layer.

Any number of LED light sources may be embedded at any desired location in the panel member 31 to provide conducted light to the light conductive core layer 33. Electrical power may be supplied to the LEDs by electrically conductive traces 20 and pads 21 bonded directly to the cladding 34 on the one side 35 of the core layer 33. The height/thickness of the embedded LEDs may be greater than, less than, or substantially equal to the height/thickness of the panel member 31 as the application requires or the technology evolves.

FIG. 11 shows several LEDs 10 mounted in slots 11 in the panel member 31 outside the viewing area 36 of the panel member using electrically conductive adhesive of the type previously described to attach the LEDs to the panel member and also electrically connect the LEDs to the electrical circuitry 20, 21 bonded to the cladding on the one side of the panel member. The viewing area 36 allows light to pass through the viewing area to and from the display device 32 while also providing illumination of the viewing area to front light the display device as described hereafter.

Whenever the lighting assembly 30 is illuminated, if the LEDs extend slightly above the uncladded side 37 of the panel member, some of the light rays emitted by the LEDs may pass over the uncladded side and directly illuminate the display device 32 overlying the uncladded side as schematically shown in FIG. 10. Other light rays emitted by the LEDs may travel in the conductive core layer 33 of the panel member while still other light rays may be reflected by the transflective cladding 34 out through the uncladded side of the viewing area 36 to illuminate the display device. Still other light rays may escape directly through the uncladded side in the viewing area 36 of the panel member to further illuminate the overlying display device. These light rays will then be reflected by the display device back out through the viewing area of the panel member to the user. Any ambient light that passes through the viewing area 36 of the panel member will illuminate the display device and then be reflected back out through the viewing area to the user irrespective of whether the lighting assembly is illuminated.

For display device applications using touch sensitive display technology, a transmissive protective layer 40 may optionally be applied to the cladded side of the panel member without degrading the illumination intensity as further schematically shown in FIG. 10.

Although the invention has been shown and described with respect to certain embodiments, it is obvious that equivalent alterations and modifications will occur to others skilled in the art upon the reading and understanding of the specification. In particular, with regard to the various functions performed by the above-described components, the terms used to describe such components are intended to correspond, unless otherwise indicated, to any component which performs the specified function of the desired component (e.g., that is functionally equivalent), even though not structurally equivalent to the disclosed component which performs the function of the herein disclosed exemplary embodiments of the invention. In addition, while a particular feature of the invention may have been disclosed with respect to only one embodiment, such feature may be combined with one or more other features as may be desired and advantageous for any given or particular application.

What is claimed is:

1. A lighting assembly, comprising:
an optical fiber light guide panel member having opposite sides, the optical fiber light guide panel member comprising:
a light conducting core having cladding attached to opposite sides of the light conducting core,
the cladding made of an optically transparent material having a lower index of refraction than the light conducting core to cause total internal reflection of conducted light within the light conducting core at the core-cladding interface,
disruptions at one or more areas of the cladding to cause conducted light within the light conducting core to be emitted from one or more areas of the optical fiber light guide panel member,
electrical circuitry including conductive traces, wherein the conductive traces are bonded to one or both sides of the cladding, and
one or more light emitting diodes (LEDs) embedded in the optical fiber light guide panel member, the LEDs being in electrical contact with the electrical circuitry and optically coupled to the light conducting core.

2. The lighting assembly of claim 1 wherein the electrical circuitry comprises conductive traces.

3. The lighting assembly of claim 2 wherein the optical fiber light guide panel member has one or more slots in which the one or more LEDs are mounted.

4. The lighting assembly of claim 3 wherein the one or more LEDs are attached to the optical fiber light guide panel member and electrically connected to the electrical circuitry by conductive adhesive.

5. The lighting assembly of claim 1 further comprising one or more switches bonded to the electrical circuitry.

6. The lighting assembly of claim 1 wherein the optical fiber light guide panel member includes a plug-in connection for connecting the electrical circuitry to a central power source.

7. The lighting assembly of claim 1 wherein the electrical circuitry comprises conductive traces that provide a means of creating current limiting resistance to a plurality of the LEDs.

8. The lighting assembly of claim 1 which comprises modular lighting for a keyboard.

9. The lighting assembly of claim 8 further comprising a feature plate for a keyboard bonded to the cladding on one side of the optical fiber light guide panel member.

10. The assembly of claim 8 wherein the electrical circuitry includes conductive pads for connection with keys of a keyboard.

11. The lighting assembly of claim 1 which comprises a separate module that is attachable to a keyboard.

12. The lighting assembly of claim 1 further comprising light dams in the optical fiber light guide panel member that redirect conducted light to difficult to reach areas of the optical fiber light guide panel member.

13. An optical fiber lighting assembly with integrated electrical circuitry, the lighting assembly comprising:
   a flat optical fiber light guide panel member having opposite sides, the optical fiber light guide panel member comprising:
      a light conducting core having cladding attached to opposite sides of the light conducting core,
      the cladding made of an optically transparent material having a lower index of refraction than the light conducting core to cause total internal reflection of conducted light at the core-cladding interface,
      disruptions at one or more areas of the cladding to cause conducted light within the light conducting core to be emitted from one or more areas of the optical fiber light guide panel member, and
      a reflective layer or feature plate bonded to the cladding on at least one of the sides of the optical fiber light guide panel member,
   electrical circuitry including conductive traces, wherein the conductive traces are bonded to the reflective layer or feature plate, and
   one or more light emitting diodes (LEDs) embedded in the optical fiber light guide panel member, the LEDs being in electrical contact with the electrical circuitry for providing electrical power to the LEDs and optically coupled to the light conducting core.

14. The lighting assembly of claim 13 wherein the optical fiber light guide panel member has one or more slots in which the one or more LEDs are mounted, the LEDs being attached to the optical fiber light guide panel member and electrically connected to the electrical circuitry by conductive adhesive.

15. The lighting assembly of claim 13 further comprising one or more switches and/or electrical components bonded to the electrical circuitry.

16. The panel assembly of claim 13 wherein the optical fiber light guide panel member includes a plug-in connection for connecting the electrical circuitry to a central power source.

17. The panel assembly of claim 13 wherein the electrical circuitry includes conductive pads to connect with keys of a keyboard.

18. A lighting assembly, comprising:
   an optical fiber light guide panel member having opposite sides, the optical fiber light guide panel member comprising:
      a light conducting core having cladding attached to one side only of the light conducting core, and
      the cladding made of an optically transflective material having a lower index of refraction than the light conducting core,
   electrical circuitry including conductive traces, wherein the conductive traces are bonded to the cladded side of the core, and
   one or more light emitting diodes (LEDs) embedded in the optical fiber light guide panel member, the LEDs being in electrical contact with the electrical circuitry and optically coupled to the light conducting core such that a portion of the light emitted by the one or more LEDs is reflected by the cladding out through the uncladded side to illuminate a display device overlying the uncladded side and reflected back through the panel member to a user.

19. The lighting assembly of claim 18 wherein a portion of the light emitted by the one or more LEDs escapes directly through the uncladded side of the panel member to illuminate the display device and reflects back out through the panel member to the user.

20. The lighting assembly of claim 18 further comprising a transmissive protective layer covering the cladding on the one side of the panel member for display device applications using touch sensitive technology.

\* \* \* \* \*